United States Patent
Guering

(10) Patent No.: US 8,749,956 B2
(45) Date of Patent: Jun. 10, 2014

(54) ELECTRICAL POWER DISTRIBUTION UNIT AND A VEHICLE HAVING SUCH A UNIT

(75) Inventor: Bernard Guering, Montrabe (FR)

(73) Assignee: Airbus Operations S.A.S., Toulouse (FR)

( * ) Notice: Subject to any disclaimer, the term of this patent is extended or adjusted under 35 U.S.C. 154(b) by 225 days.

(21) Appl. No.: 13/455,559

(22) Filed: Apr. 25, 2012

(65) Prior Publication Data

US 2012/0285950 A1 Nov. 15, 2012

(30) Foreign Application Priority Data

Apr. 26, 2011 (FR) ...................................... 11 53549

(51) Int. Cl.
*H05K 7/14* (2006.01)
*H05K 7/18* (2006.01)

(52) U.S. Cl.
USPC .......... 361/601; 361/605; 361/644; 361/93.1; 361/807; 307/18; 307/66

(58) Field of Classification Search
USPC .............. 361/93.1, 93.2, 93.7, 115, 601, 605, 361/611, 612, 614, 616, 624, 644, 748, 752, 361/731, 756, 788; 307/18, 19, 23, 28, 31, 307/32, 66, 113, 115, 139; 700/9, 22, 286, 700/292; 312/223.2, 408
See application file for complete search history.

(56) References Cited

U.S. PATENT DOCUMENTS

| | | | |
|---|---|---|---|
| 2,938,686 A * | 5/1960 | Lohstreter et al. ......... | 244/118.1 |
| 5,594,285 A * | 1/1997 | Wisbey et al. ................ | 307/18 |
| 5,936,318 A * | 8/1999 | Weiler et al. .................... | 307/66 |
| 7,020,790 B2 * | 3/2006 | Mares ........................... | 713/340 |
| 7,515,400 B2 * | 4/2009 | Healy et al. ................... | 361/644 |
| 7,706,927 B2 * | 4/2010 | Naumann et al. ............. | 700/292 |
| 7,805,204 B2 * | 9/2010 | Ghanekar et al. ............... | 700/22 |
| 7,959,453 B2 * | 6/2011 | Guering ........................ | 439/165 |
| 8,035,985 B2 * | 10/2011 | Nemoz et al. ................. | 361/797 |
| 8,396,612 B2 * | 3/2013 | Fernandez-Ramos ............ | 701/3 |

(Continued)

FOREIGN PATENT DOCUMENTS

FR 2786326 B1 * 6/2002 ........... H05K 1/0263
WO WO 2007/113312 A1 10/2007

(Continued)

OTHER PUBLICATIONS

French Preliminary Search Report and Written Opinion issued Feb. 3, 2011, in French 1052750, (with English Translation of Categories of Cited Documents).

*Primary Examiner* — Michail V Datskovskiy
(74) *Attorney, Agent, or Firm* — Oblon, Spivak, McClelland, Maier & Neustadt, L.L.P.

(57) ABSTRACT

In an electrical cabinet (110) for an electrical power unit that carries out electrical power switching for at least multiple electrical power switching equipment (50), the electrical power switching equipment (50) is attached to a front of at least a support grid rack (31) arranged as a matrix with n rows and p columns, where n and p are greater than or equal to two.

Figure 1A:
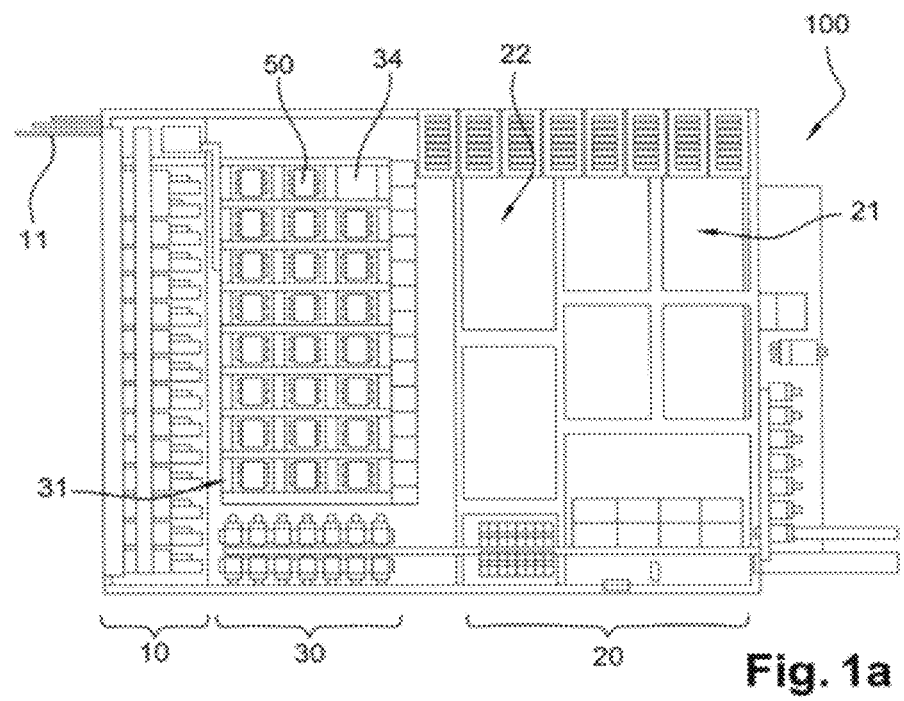

Each piece of equipment (50) is attached to the grid rack at a slot (34) in the grid rack, open to the front of the grid rack (31) and to the rear of the grid rack to allow installation from the front of the equipment and to allow access from the front to the rear of the grid rack through the slots (34).

13 Claims, 6 Drawing Sheets

(56) References Cited

U.S. PATENT DOCUMENTS

| | | | |
|---|---|---|---|
| 8,559,149 B2 * | 10/2013 | Wavering et al. | 361/93.1 |
| 2009/0091187 A1 | 4/2009 | Tardy | |
| 2011/0194269 A1 * | 8/2011 | Colongo et al. | 361/807 |

FOREIGN PATENT DOCUMENTS

| WO | WO 2009/125007 A2 | 10/2009 |
|---|---|---|
| WO | WO 2010/037934 A2 | 4/2010 |
| WO | WO2013/045809 A2 * | 4/2013 |

* cited by examiner

ELECTRICAL POWER DISTRIBUTION UNIT AND A VEHICLE HAVING SUCH A UNIT

This invention relates to the field of electrical power distribution.

More specifically, the invention relates to an electrical power unit for distributing electricity from various power generators into multiple distribution networks, such as what is found in confined environments.

Especially for aircraft, and more generally for means of transport or independent systems for energy, electrical energy is especially important because it is necessary for most types of equipment to operate and is more and more often their main source of energy.

Therefore, electrical systems for generation and distribution are designed to ensure that all equipment providing important functions will continuously remain powered with electricity.

For this, confined environments usually have several generators and several electrical power distribution systems to alleviate any failures in parts of the power generation or distribution system.

This outline must also take into account that different current types—220 volts of alternating current (220 VAC), 115 volts of three-phase voltage (115 VAC) and 28 volts of direct current (28 VDC)—must be distributed, as is the case in modern aircraft.

It is known to take these different constraints into consideration when making electrical power units that receive different sources of electricity, such as alternators, transformers, and batteries, and then distribute these different sources to different electrical distribution bars, based on the configuration of the sources and bars, by means of electrical contactors with the appropriate level of electrical power switching capabilities that are electrically connected by wires, according to the desired arrangement.

An electrical power unit therefore requires multiple power cables to connect the contactors and the bars.

Currently, the electrical power unit of an aircraft, typically split into two sections that are separate from one another (segregation) for safety reasons, is mainly made in the form of electrical cabinets having equipment holders and power cable support ramps, each power cable connecting a piece of equipment, such as a contactor or a circuit breaker, to another piece of equipment or to an electrical terminal board of a bar.

The power cables run along the ramps following a determined path, the cables being attached to the ramps by clamps. The inside of each electrical cabinet, once installed in the aircraft's cargo compartment, is accessible by a front side, by which the equipment can be installed and removed, and usually by a back side, by which the cables can be checked, repaired, or changed, without strictly enforcing such an arrangement, meaning that, particularly to save in volume and mass, some equipment may be accessible from the back and some cables may be accessible from the front.

Such an electrical power unit, particularly in aircraft, poses installation problems due to the volume and mass it represents in itself and also due to the access that must be possible on its different sides in order to allow the equipment and cables inside of the electrical power unit to be maintained.

These constraints are even more limiting because the electrical power unit of an aircraft is usually placed in an area with limited space along with lots of other equipment. Typically for an airplane, the electronics compartment is most often located under the cockpit.

There is therefore significant interest in improving the density of the equipment inside of an electrical power unit while allowing for the electrical power unit to be maintained and changed with access on one side of the unit.

To achieve these objectives, this invention provides an electrical cabinet for an electrical power unit in which the electrical power switching equipment is attached to the side of a front with at least a support grid rack arranged as a matrix of n rows, with n being greater than or equal to two, and p columns, with p being greater than or equal to two, in which the grid rack for each piece of equipment is attached to the grid rack at the slot of the open grid rack on the front of the grid rack and on a rear opposite the front of said grid rack.

Such an arrangement makes it possible to achieve a high density of switching equipment and therefore reduce the volume required for this equipment.

For easier installation and removal of equipment without having to access a front of the electrical cabinet, the means for an electrical connection and mechanical attachment for each piece of equipment area arranged at each slot such that the power switching equipment is installed or removed by and from the front of the grid rack.

Also, to allow installation and/or maintenance work to be carried out on a rear of the grid rack from the front of the grid rack, and therefore through the grid rack, the sizes of the slots are such that they form, without equipment in the slots, passages between the front and rear of the grid rack with large enough opening to allow a maintenance operator to place a forearm through a slot of the grid rack and to thus work by observing his or her movements and work.

In one embodiment, the means for an electrical connection and mechanical attachment of a piece of equipment mainly include means for clamping electrical lugs from the equipment onto first electrical lugs on the grid rack, the lugs on both the equipment and the grid rack having an appropriate mechanical resistance to support the weight of the equipment, such that there is a limited number of interfacing elements between the equipment and the grid rack.

Alternatively or additionally, the equipment is attached to the grid rack by means of a mechanical attachment, such as screws or clip mechanisms, to ensure a mechanical attachment that is independent of the electrical connections. In this case, the electrical connections can be provided by electrical lugs with or without a mechanical attachment or by other types of electrical connections, such as insertion contacts.

The electrical connection means, whether first electrical lugs or other connection types, are external to the conductors integrated into the structure of the grid rack, which limits the number of visible cables.

To incorporate as many conductors as possible into the structure of the grid rack, the power cables outside of the grid rack are connected to second electrical lugs located on the rear of the grid rack, these second lugs being external to the conductors integrated into the structure of the grid rack.

In an advantageous embodiment of a grid rack having regular slots, the grid rack is formed by an assembly of posts and cross members spaced so as to form slots and preferably to reduce the mass and improve the electrical insulation between the different conductors integrated into the grid rack, the posts and cross members of the grid rack are made from an electrically insulating material, such as a composite material having aramid or glass fibers in a matrix of organic resin, the posts and/or cross members being hollow in order to hold the electrical conductor elements.

Advantageously, to improve the mechanical performance of the structure of the electrical cabinet and to reduce the total mass, the grid rack is made such that it contributes to the mechanical strength of the cabinet, the structure of the grid rack being integrated into the structure of the electrical cabinet and attached to the structure of the electrical cabinet in order to support the stress outside of the grid rack.

The invention also relates to a means of transport in which the onboard electrical system includes an electrical power unit, which has at least an electrical cabinet according to the invention.

Such a means of transport that takes advantage of the invention by the improved mass and size and by easier maintenance of its electrical power unit, is, for example, a ground vehicle, a surface or underwater vessel, a space vehicle, or an aircraft, such as an airplane.

The invention will be better understood from the description of an enclosure particularly with an electrical power unit according to the invention, referring to the drawings that illustrate it without limitation.

Figure 1B:
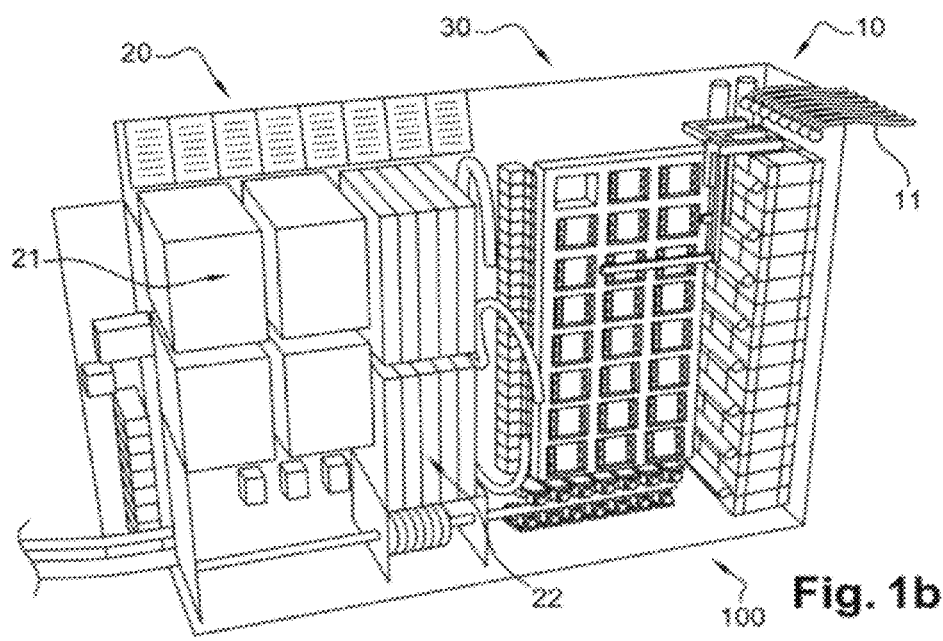
Figure 2:
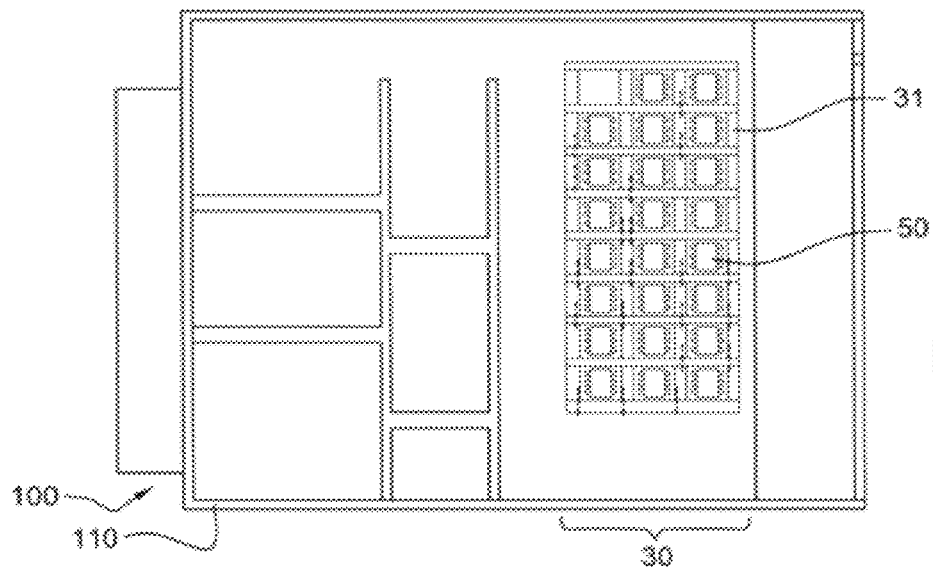
Figure 3:
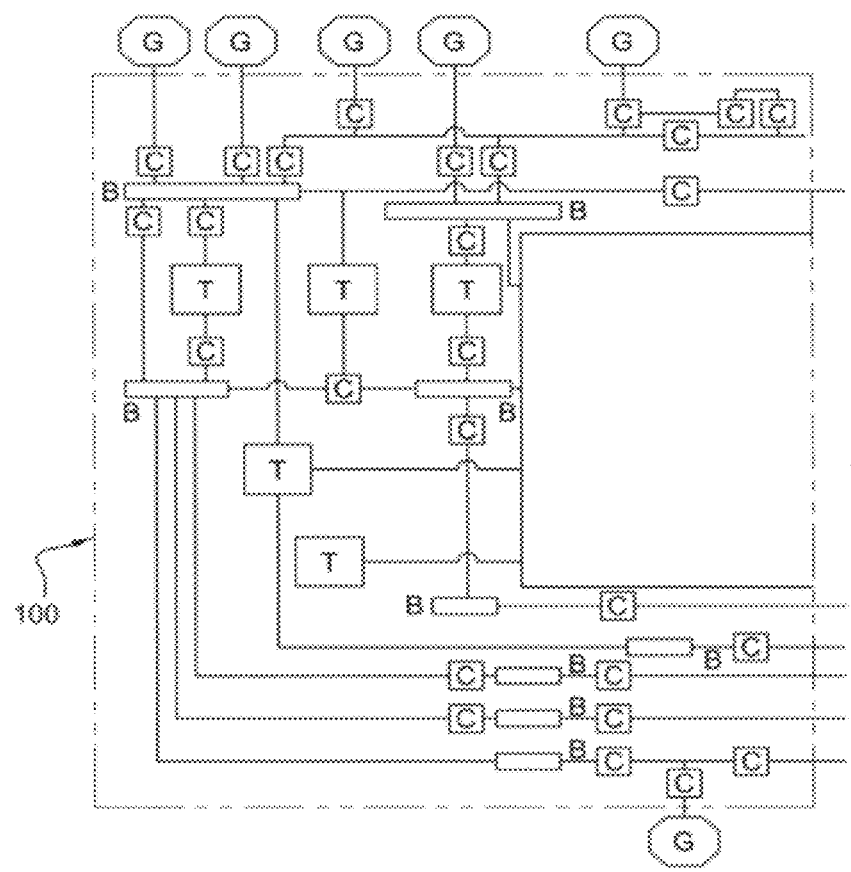
Figure 5A:
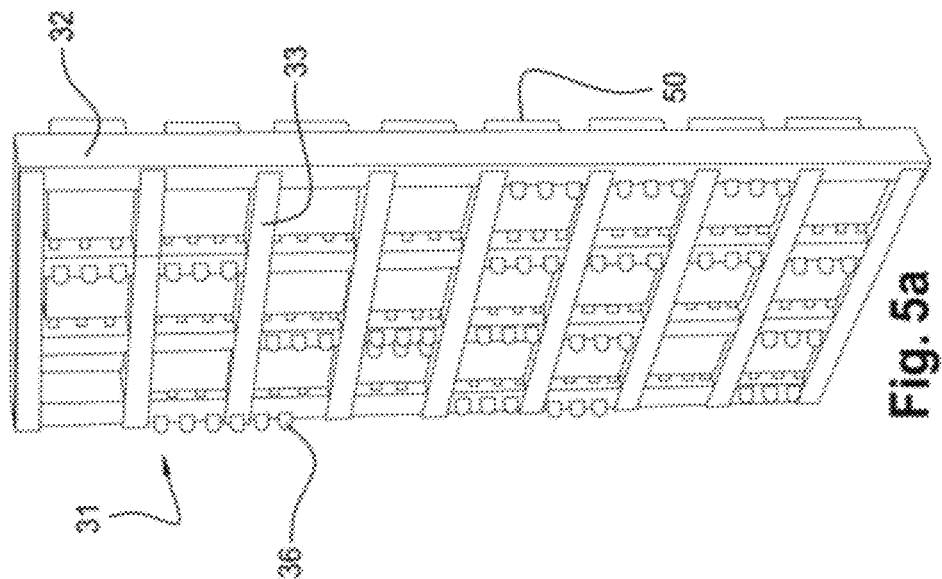
Figure 4:
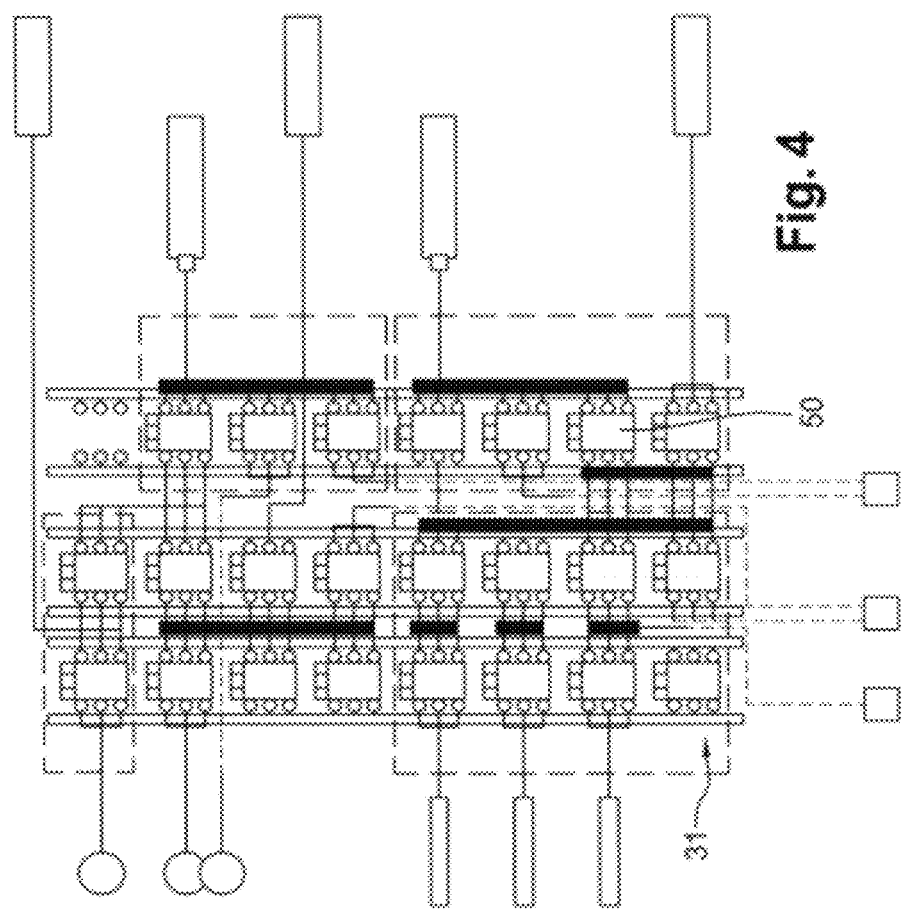
Figure 5B:
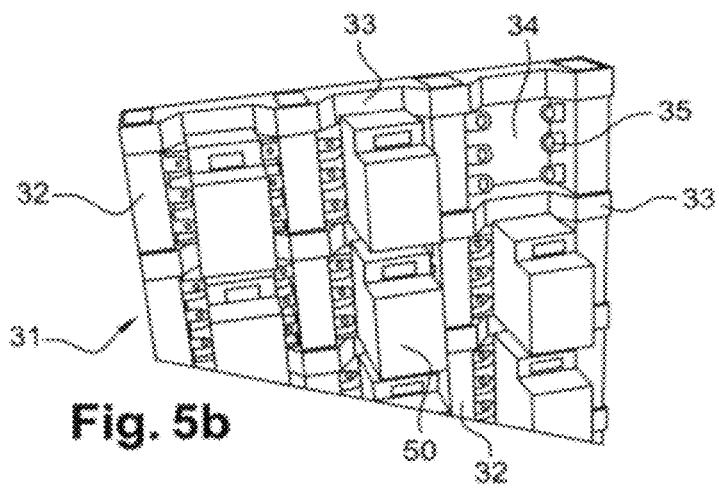
Figure 5C:
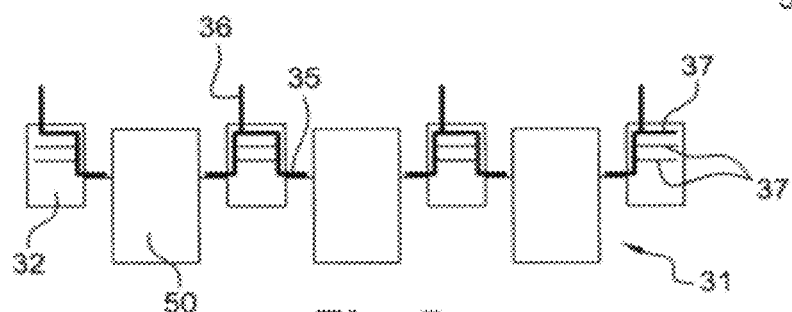
Figure 7:
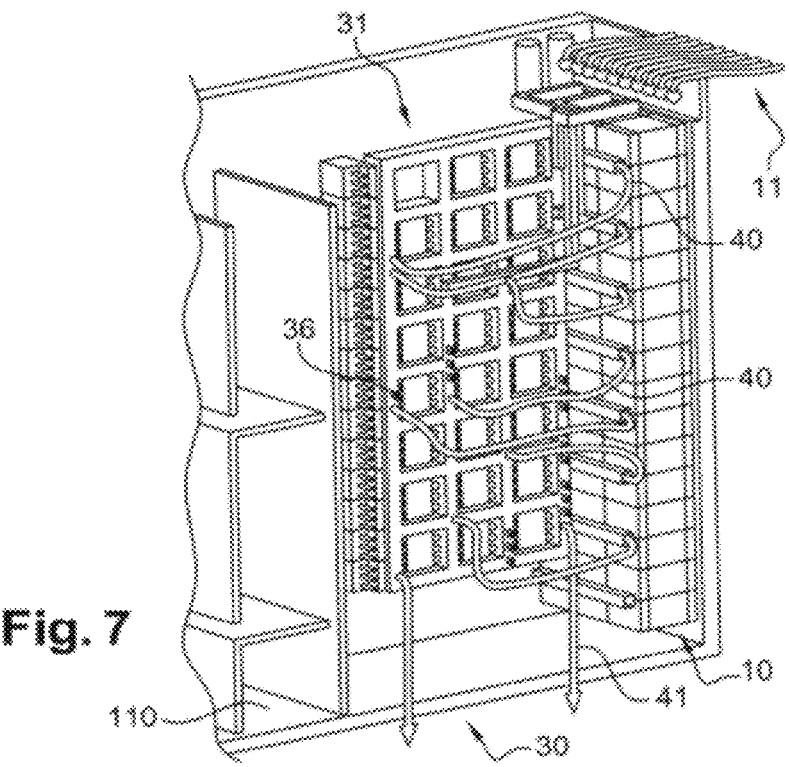
Figure 6A:
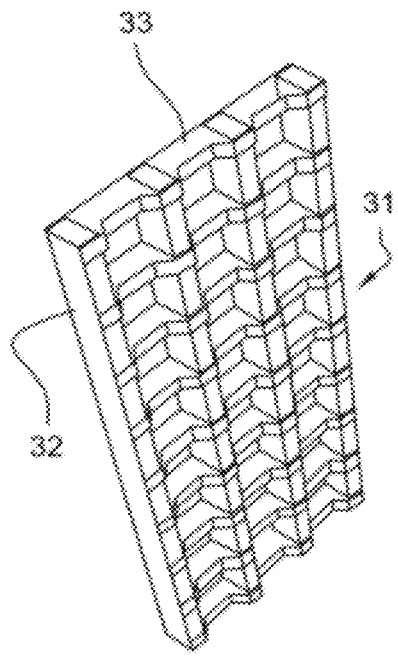
Figure 6C:
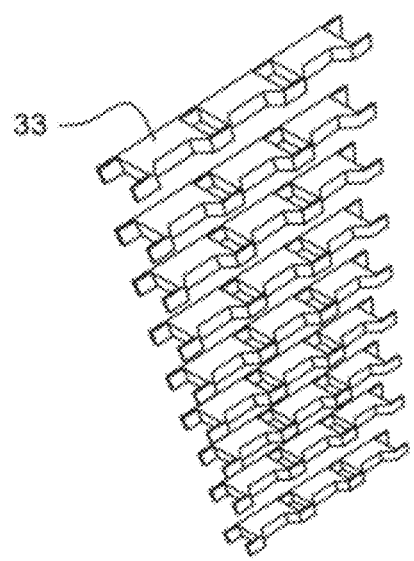
Figure 6B:
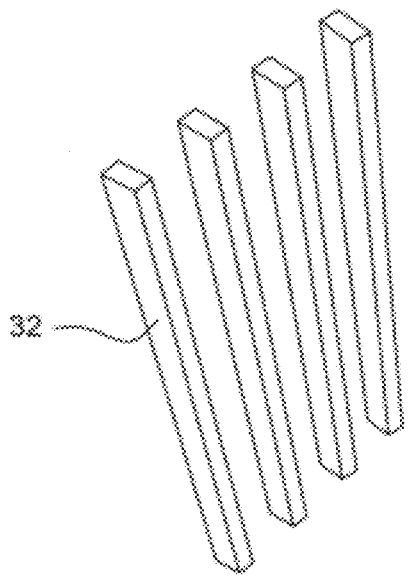
Figure 6D:
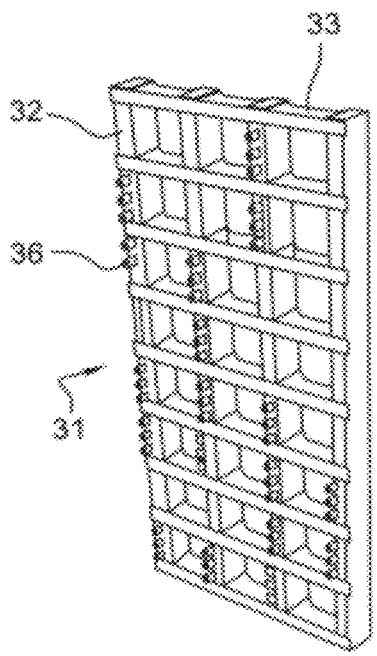
Figure 8A:
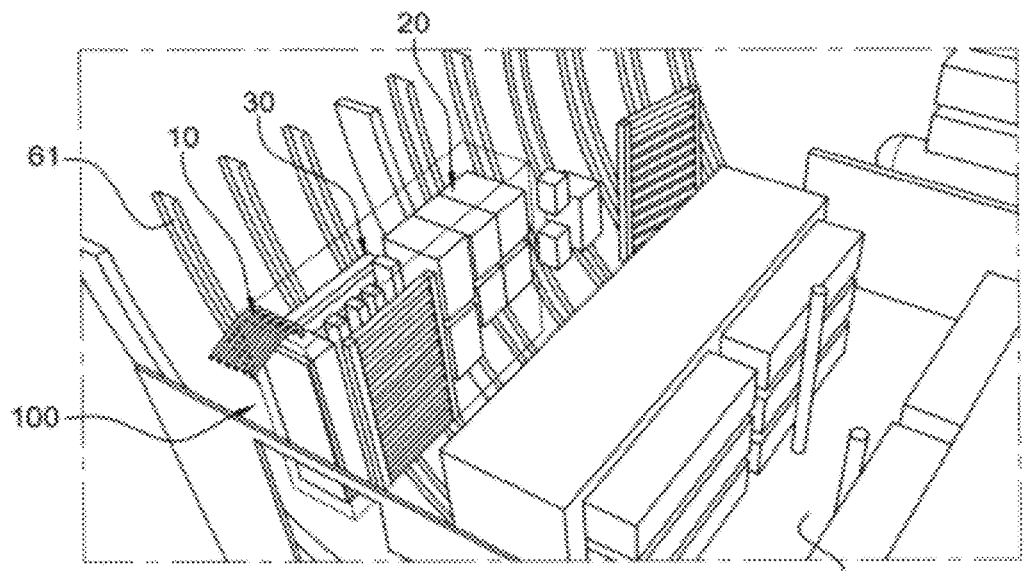
Figure 8B:
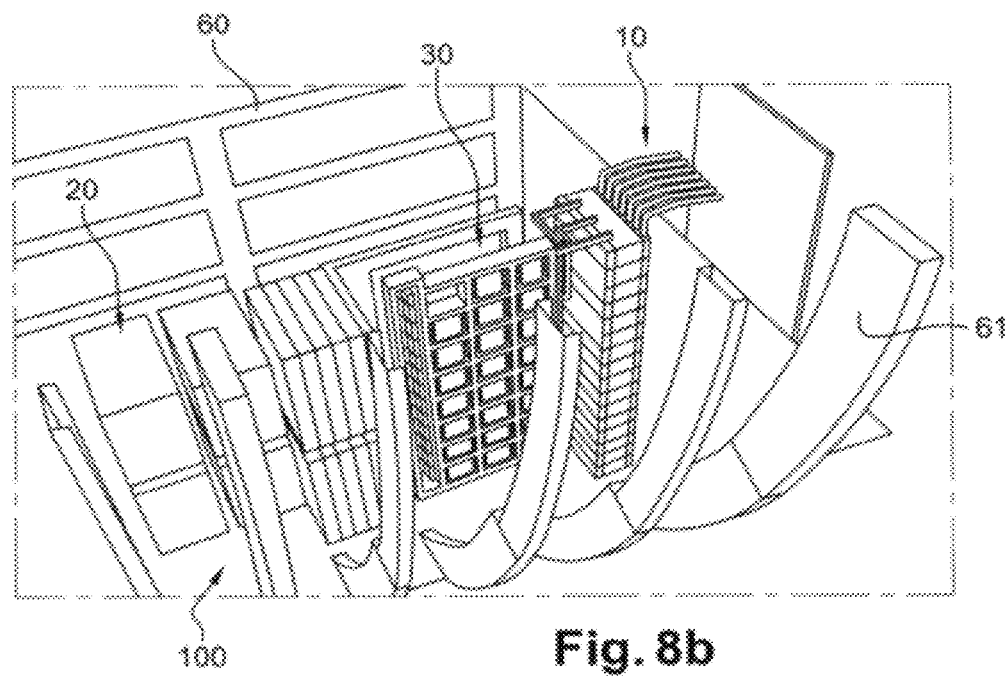

FIG. 1a: A front view of an electrical cabinet according to the invention, without the cabinet's cover panels;

FIG. 1b: A perspective view of the back of the cabinet in FIG. 1a;

FIG. 2: A schematic front view of the cabinet structure without equipment;

FIG. 3: An example of a theoretical circuit diagram for an electrical cabinet for distributing electricity from an electrical power unit;

FIG. 4: The representation of an arrangement of a support grid rack for means of switching power corresponding to the diagram in FIG. 3;

FIG. 5a: An equipped structure of the grid rack in FIG. 4, as a perspective view from the rear of the grid rack;

FIG. 5b: A partial perspective view of the front of the equipped grid rack;

FIG. 5c: A section in a horizontal plane of the grid rack at a row of equipment;

FIG. 6a: A perspective view of the structure of the grid rack;

FIG. 6b: A full view of the posts of the structure in FIG. 6a;

FIG. 6c: A full view of the cross members of the structure in FIG. 6a;

FIG. 6d: A perspective view of the structure of the grid rack in FIG. 6a from the rear with the conductors integrated into the structure;

FIG. 7: A partial perspective view from the rear of the electrical cabinet illustrating the electrical connections of the equipment on the grid rack;

FIG. 8a: A perspective view from the inside of the electronics compartment of an airplane incorporating an electrical cabinet that is compliant with the cabinet in FIG. 1a;

FIG. 8b: The electronics compartment in FIG. 8a seen from the outside of the airplane, with the cover of the fuselage being removed.

FIGS. 1a and 1b show overviews of an electrical cabinet 100 of an electrical power unit according to the invention.

In these views, the outer walls of the electrical cabinet are not shown in order to show the internal composition from a front view in FIG. 1a and from a perspective view from the rear of the electrical cabinet in FIG. 1b.

For the purposes of the description, references to the conventional notions of "high", "low", "side", "front", and "rear" will be from the perspective of an observer of the electrical cabinet in FIGS. 1a and 1b facing the electrical cabinet in a position he or she may have in an electronics compartment, the main equipment in the electrical cabinet being accessible from this side, corresponding to the view in FIG. 1a.

Unless otherwise indicated or obvious, it should be understood that the term "electric" generally applies to the description when related to energy, distribution, commutators, contactors, or conductors.

The electrical cabinet 100 includes three main areas:
an area for electrical distribution 10;
an area for power switching 30;
an area for equipment 20.

The area for equipment 20 here is reserved for equipment 21, 22 that is relatively heavy and less numerous, such as converters or transformers. Installing this equipment requires a sufficiently strong support structure, which is not the subject of this invention and which will not be described in greater detail. The area 20 also includes electronic equipment for managing the electrical power unit, such as secondary distribution equipment, usually requiring less electrical power, such as static circuit breakers.

The area for distribution 10 mainly contains circuit breakers that protect or insulate the lines powered by the electrical cabinet.

The circuit breakers are arranged on a board, here on one side of the electrical cabinet from which the distribution bundles 11 exit on the cabling paths.

The area for power switching 30 groups the equipment, contactors, and commutators, providing power switching functions for the electrical cabinet 100, and it groups the distribution bars that transport currents from or to the power switching equipment.

This arrangement for the electrical cabinet 100 leads to an inside structure of said electrical cabinet shown in FIG. 2, in which the structure of a grid rack 31, shown in the drawing without a physical connection to the rest of the structure for the purposes of clarity in the drawing, supports the power switching equipment 50 in the area for power switching 30.

The grid rack 31, as illustrated in FIGS. 5a and 5b, determines by the posts 32 and cross members 33, slots 34 in the grid rack, slots that are arranged in a two-dimensional matrix with at least two rows and two columns, usually with n rows and p columns.

The posts 32 and cross members 33 are attached to form the grid rack 31 substantially at right angles so that the slots 34 are substantially rectangular, their spacing determining the size of the slots.

In the preferred embodiment shown, the posts 32 and the cross members 33 are evenly spaced such that all of the slots 34 are the same size.

The slots 34 are open all the way through, meaning that if there is no equipment in a slot, the opening left by said slot extends between a front of the grid rack 30 located on the front of the electrical cabinet 100 and a rear of the grid rack opposite the front, located on the rear of said electrical cabinet.

At each slot 34, as illustrated in FIG. 5b, the grid rack also includes means for electrically connecting and mechanically attaching equipment corresponding to the first electrical connection lugs 35 whose relative provision is similar to the relative provision of the power switching equipment lugs 50 attached to the grid rack 31 such that the equipment lugs are opposite the first lugs 35 of a slot of the grid rack 31 when a piece of equipment is placed in or on said slot and the means of clamping the lugs, typically screws, simultaneously mechanically hold the equipment in or on the slot and clamp the electrical contacts between the opposite lugs.

In practice, equipment attached to a slot can be more or less inside of the slot, this position being determined, at least in part, by the position of the first lugs depending on the depth of the slot, a position based on a design decision that can possibly be dictated by considerations, such as mechanical resistance or equipment ventilation.

The first lugs 35 are outside of the conductors 37 integrated into the grid rack 31, schematically shown in FIG. 5c representing a section in a horizontal plane of the grid rack between two cross members, said conductors forming distribution bars or conductors between the lugs of the grid rack.

The second electrical connection lugs 36 extending to the rear of the grid rack corresponding to the outside of the conductors 37 integrated into the grid rack 31.

The second lugs 36 are implemented for connecting electrical wires 40, 41 between the grid rack 31 and the electrical connection points of the area 10 of the electrical cabinet 100, or with outside connections 41 to said electrical cabinet as schematically shown in FIG. 7.

To ensure the support of the power switching equipment 50 and the integration of the conductors 37 and the lugs 35, 36, the grid rack 31 is a rigid structure with the appropriate level of mechanical resistance and electrical insulation, at least in part.

For example, the grid rack is made of an insulating composite material, insulating in the sense that its resistance and electrical conductivity characteristics qualify as electrical insulation of the electrical power distribution circuits, such that a composite containing fiberglass or Kevlar® is maintained in a cured organic resin.

The structural part of the grid rack 31 illustrated in FIG. 6a is advantageously obtained by a structural assembly, such as by bonding, of a set of posts 32 as similar as possible due to manufacturing costs, FIG. 6B, with cross members 33 that are also as similar as possible, FIG. 6c.

At a stage that is more or less advanced relative to the structural assembly of the grid rack 31, the integrated conductors 37 are attached in the posts 32, which are advantageously hollow, FIG. 6d, so as to correspond to an electrical diagram for defining the electrical cabinet, an example of which is illustrated in FIG. 3.

The locations in the grid rack 31 of the various power switching equipment 50 based on their characteristics is determined jointly with the definition of the integrated conductors 37 in the grid rack 31 for an operation that is consistent with an electric diagram of the electrical cabinet 100.

Whenever possible, the only visible parts of the conductors 37 integrated into the grid rack 31 are the first and second lugs 35, 36.

The integrated conductors 37 attached to the grid rack 31 are insulated as much as necessary to prevent any electrical contact between the different conductors.

The theoretical electrical diagram in FIG. 3 shows all of the different equipment in the electrical cabinet 100, including power switching equipment C, transformers T, and distribution bars B with their functional relationships, as well as electrical power generators G that are outside of the electrical cabinet.

In the arrangement of power switching equipment 50 on the grid rack 31, a solution is chosen, if possible, that requires only connections between the lugs, the first lugs 35 and/or the second lugs 36, located on the same post 32.

If this condition is not possible or desirable, the connection is advantageously completed by a wire forming a bridge between the second dedicated lugs on different posts.

To comply with the electrical diagram of the electrical cabinet 100, the integrated conductors in the grid rack 31 provide:

the function of bars B for distributing electricity from the current sources, generators G, converters, transformers T, batteries, etc., connected 41 on second lugs 36 to the first lugs 35;

the connections from the first lugs 35 to the second lugs 36 on which are connected electrical wires 40 distributing circuit breakers from the distribution area 10, as illustrated in FIG. 7;

connections between the first lugs 35,

Note that in the grid rack 31, the power switching equipment 50, which was already mentioned as being attached by means of clamping the lugs of said equipment on the first lugs 35 of the grid rack, is assembled and disassembled by a single side of the electrical cabinet 100, a side that corresponds to a front side having the most accessibility when said electrical cabinet is installed in an electronics compartment;

the slots 34 are large enough, typically to allow free passage of 10 cm or more, such that a maintenance operator can put a hand and a forearm into said slot in order to access the area located behind the grid rack 31, from the front, in order to service the cables. Such service is necessary, for example, during operation in order to change a definition by removing or by adding electrical wires or even to carry out a repair that may require a wire to be replaced, and it is possible by having all or some of the power switching equipment 50 to allow an operator to insert his hands in the back of the grid rack and see the operations he is performing;

advantageously, when the slots 34 in the grid rack are the same size for all of said slots, these slot sizes are defined as that of the most restrictive equipment 50;

the grid rack is clearly sized on the structural consideration in order to support the equipment in the vibratory environment and the accelerations expected in service of the electrical cabinet, and it is advantageously completed and assembled in order to contribute to the structural resistance of the electrical cabinet, meaning to withstand the outside stress on the grid rack coming from the electrical cabinet to which it is attached and thus to lighten the overall structure of said cabinet.

With regard to the size characteristics, it should be noted that, in existing electrical systems, the size of the switching equipment is variable, most often based on the performance of the equipment, particularly their switching capacities. In the case of the invention, all of the equipment 50 preferably has the same dimensions as the most restrictive equipment, except possibly the depth of the equipment, so as to be mounted in or on one of the slots 34 whose size and attachment interfaces are advantageously standardized in a grid rack 31.

In an alternative embodiment that allows the invention to be implemented with existing switching equipment, the equipment is first attached to plates of standardized sizes adapted to the sizes of the slots 34, said equipped plates being attached as equipment of standardized sizes on the first lugs 35.

The use of standard sizes for the slots 34 and the switching equipment 50 obviously does not exclude the placement of polarizing slots on said slots and on said equipment to prevent inappropriate equipment from being installed in a given slot.

FIGS. 8a and 8b show an electrical power unit electrical cabinet 100 according to the invention, installed in an airplane's cargo compartment 60.

By allowing maintenance operations only through the front of the electrical cabinet 100, it can be installed along a wall, shown in the drawings by frames 61 of the airplane's structure, while a conventional architecture requires a more central installation in the cargo compartment to allow access through the front and rear of the electrical cabinet.

With this ability to be installed along a wall, it is also easier to design an arrangement with two electrical cabinets, which usually form an electrical power unit, with the distances between cabinets being required in order to provide the proper segregation.

It is well understood from this description that the arrangement of the electrical cabinet 100 can take various forms, particularly in the arrangement and in the number of different areas, and integrate a grid rack like the grid rack 31 that has been described without departing from this invention.

Preferably, in the embodiment described in detail, the equipment is mechanically maintained by their electrical lugs, but additional, purely mechanical attachments can be used, if necessary.

It is also possible to separate the electrical and mechanical functions of the electrical lugs.

Thus, in an embodiment that is not shown, the electrical connection elements that electrically connect power switching equipment 50 and the mechanical attachment elements maintain the position of said power switching equipment and are distinct, for example the electrical connections being carried out by means of insertion contacts and mechanical attachment being carried out by clamping devices, such as a screw or clip mechanism.

The invention therefore allows the design and implementation of an airplane in which the electrical power unit is lighter due to the better integration of components and the structure of the electrical cabinets, in which the electrical cabinets are smaller relative to a conventional solution due to a better integration of the equipment and their electrical connections, and they are easier to install and maintain, particularly due to the access to all components of the electrical power unit from the front of each electrical cabinet.

The invention also allows the installation of an electrical power unit respecting the distances between electrical cabinet, distances made possible by access to the components of a cabinet through only one side of the cabinet, in spaces in which the available room does not allow the integration of a conventional electrical power unit.

The invention claimed is:

1. An electrical cabinet for an electrical power unit having multiple electrical power switching equipment, wherein
    the electrical power switching equipment is attached to the side of a front side with at least a support grid rack arranged as a matrix of n rows, with n being greater than or equal to two, and p columns, with p being greater than or equal to two, in which the grid rack for each piece of equipment is attached to the grid rack at the slot of the open grid rack on the front of the grid rack and on a rear opposite the front of said grid rack.

2. An electrical cabinet according to claim 1 in which the means for an electrical connection and mechanical attachment for each piece of equipment area is arranged at each slot such that the power switching equipment is installed or removed by and from the front of the grid rack.

3. An electrical cabinet according to claim 2 in which the sizes of the slots are such that they form, without equipment in said slots, passages between the front and rear of the grid rack with large enough opening to allow a maintenance operator to place a forearm through a slot of said grid rack.

4. An electrical cabinet according to claim 2 in which the means for an electrical connection and mechanical attachment of a piece of equipment mainly include means for clamping electrical lugs from the equipment onto first electrical lugs on the grid rack.

5. An electrical cabinet according to claim 2 in which the means for mechanically attaching a piece of equipment to the grid rack are separate from the means of electrical connection.

6. An electrical cabinet according to claim 2 in which the means of electrical connection are external to the conductors integrated into the structure of the grid rack.

7. An electrical cabinet according to claim 1 having second electrical connection lugs for electrical wires on the rear of the grid rack, said second lugs being external to the conductors integrated into the structure of the grid rack.

8. An electrical cabinet according to claim 1 in which the grid rack is formed by an assembly of posts and cross members spaced so as to form slots.

9. An electrical cabinet according to claim 8 in which the posts and cross members of the grid rack are made from an electrically insulating material.

10. An electrical cabinet according to claim 8 in which the posts and/or the cross members of the grid rack are hollow.

11. An electrical cabinet according to claim 1 in which a structure of the grid rack is integrated into a structure of the electrical cabinet and attached to said structure of said electrical cabinet to support stress outside of the grid rack.

12. A means of transport having an electrical power unit having at least one electrical cabinet according to claim 1.

13. An airplane having an electrical power unit having at least one electrical cabinet according to claim 1.

* * * * *